United States Patent [19]
Murakami

[11] Patent Number: 5,436,560
[45] Date of Patent: Jul. 25, 1995

[54] METHOD AND DEVICE FOR DETECTING ELECTROMAGNETIC CHARACTERISTIC CHANGING PORTION

[75] Inventor: Taku Murakami, Hiratsuka, Japan

[73] Assignee: Kabushiki Kaisha Komatsu Seisakusho, Tokyo, Japan

[21] Appl. No.: 122,591

[22] PCT Filed: Mar. 24, 1992

[86] PCT No.: PCT/JP92/00352
§ 371 Date: Sep. 29, 1993
§ 102(e) Date: Sep. 29, 1993

[87] PCT Pub. No.: WO92/17749
PCT Pub. Date: Oct. 15, 1992

[30] Foreign Application Priority Data
Mar. 29, 1991 [JP] Japan .................. 3-091353

[51] Int. Cl.⁶ .................. G01B 7/14; G01R 33/06
[52] U.S. Cl. .................. 324/207.21; 324/207.25
[58] Field of Search .......... 324/207.12, 207.2, 207.21, 324/207.25, 173, 174, 235, 251, 252; 338/32 R

[56] References Cited
FOREIGN PATENT DOCUMENTS
56-1567  1/1981  Japan .
59-146720 10/1984  Japan .

*Primary Examiner*—Walter E. Snow
*Attorney, Agent, or Firm*—Richards, Medlock & Andrews

[57] ABSTRACT

A method for sensing with a high accuracy a single part, at which electromagnetic characteristics of a member to be sensed are changed, and for obtaining the output whose waveform is of a narrow peak width, and the device thereof. For this purpose, four electromagnetic sensing elements (10A-10D) are so aligned that when the two elements (10A, 10B) are simultaneously in the positions just over a protruding part (16) where electromagnetic characteristics are changed, the other two elements (10C, 10D) are in the positions just over a recessed part (18). Further, the mutually opposing two arms of a bridge circuit (30) are connected with one of the electromagnetic sensing elements (10A, 10B) and one of the elements (10C, 10D) respectively. Thereby, a single output having a waveform corresponding to the part at which the electromagnetic characteristics are changed is sensed.

25 Claims, 6 Drawing Sheets

METHOD AND DEVICE FOR DETECTING ELECTROMAGNETIC CHARACTERISTIC CHANGING PORTION

FIELD OF THE INVENTION

This invention relates to a method and a device for detecting an electromagnetic characteristic changing portion formed on a member to be detected, such as a position detecting device of a hydraulic cylinder, a linear scale, or a rotary encoder.

BACKGROUND ART

Conventionally, in a position sensor or the like, an electromagnetic characteristic changing portion consisting of concave and convex grooves is formed on a scale; a magnetic field is applied to the electromagnetic characteristic changing portion; and an electromagnetic sensing element, such as a ferromagnetic thin-film magneto-resistive element, is used to detect fluctuation of magnetic flux caused by the electromagnetic characteristic changing portion. To detect the fluctuation of magnetic flux with a high sensibility, a bridge circuit can be made up of four magneto-resistive elements.

Figure 4A:
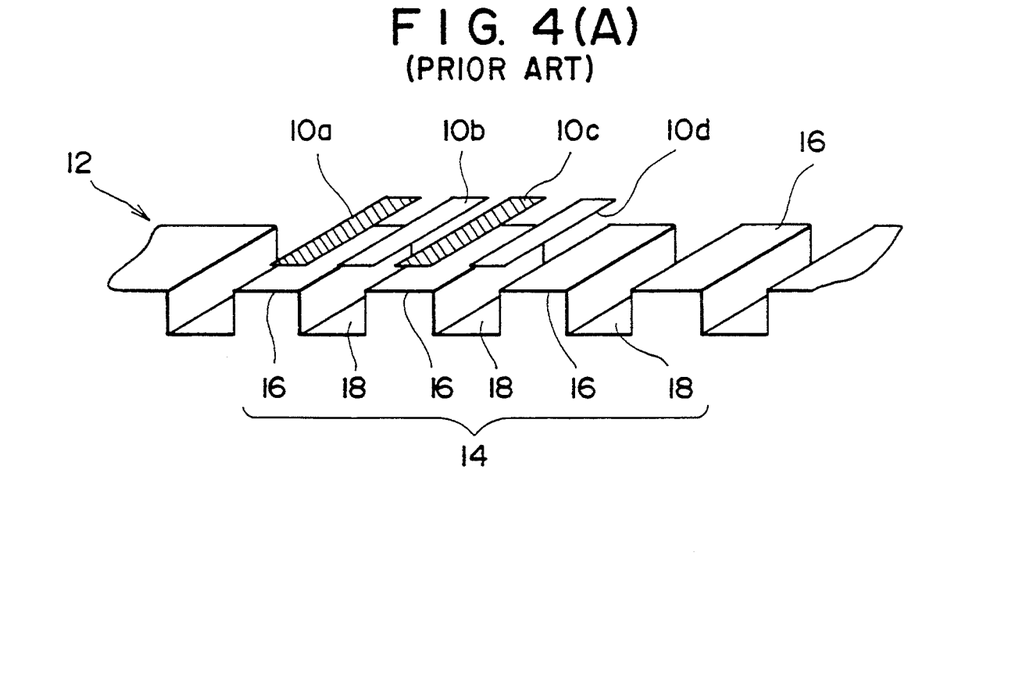
FIG. 4(A) is a perspective view showing conventional magneto-resistive elements aligned with respect to an electromagnetic characteristic changing portion.

More particularly, as shown in FIG. 4(A), four magneto-resistive elements 10a through 10d are arranged along a graduation 14 consisting of concave and convex grooves formed on a scale 12. Then, when the magneto-resistive element 10a and the next magneto-resistive element 10c but one are simultaneously located at positions corresponding to a convex region 16 of the scale 12, the remaining two magneto-resistive elements 10b and 10d are located at positions corresponding to a concave region 18.

Figure 4B:
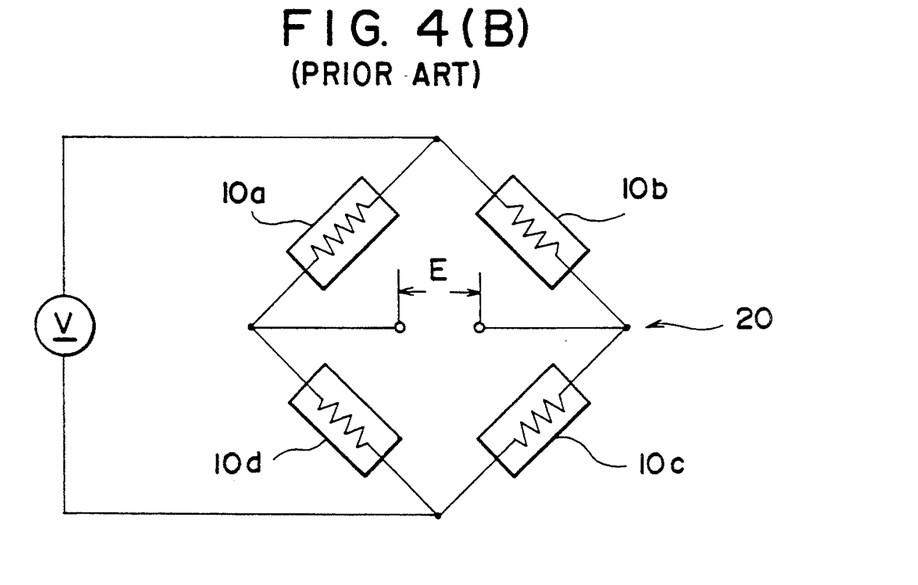
FIG. 4(B) is a view of a bridge circuit formed of these magneto-resistive elements.

Furthermore, the magneto-resistive elements 10a through 10d constitute, as shown in FIG. 4(B), a bridge circuit 20 that serves as a detection circuit. More particularly, the cross-hatched magneto-resistive elements 10a and 10c that arrive simultaneously to the positions corresponding to the convex regions 16 compose two opposing sides of the bridge circuit 20. The magneto-resistive elements 10b and 10d that arrive to the positions corresponding to the concave regions 18 compose the other two opposing sides of the bridge circuit 20. In this event, if Ra through Rd denote electrical resistance of the magneto-resistive elements 10a through 10d, respectively, then an output E of the bridge circuit 20 can be represented by:

$$E \propto Rb \times Rd - Ra \times Rc \quad (1).$$

Figure 5:
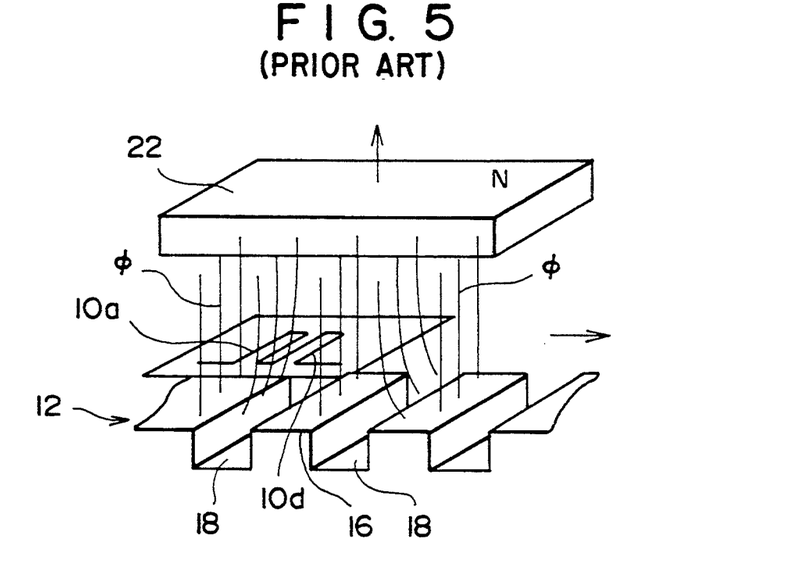
FIG. 5 is a perspective view showing how the magnetic field is applied to the electromagnetic characteristic changing portion.

In the bridge circuit 20 made up in the manner described above, the scale 12 is formed by the concave and convex grooves consisting of the convex regions 16 and the concave regions 18. Accordingly, as shown in FIG. 5, the magnetic field (magnetic flux $\Phi$) applied by a magnet 22 is fluctuated and deviated at the edge portions of the convex regions 16 of the scale 12. As a result, when the output of the bridge circuit 20 has a repetitious waveform as in the case of a position sensor, it is possible to carry out successfully a comparator processing for repeatedly digitizing the output of the bridge circuit 20.

However, when the electromagnetic characteristic changing portion(s) is/are formed singly or at spaces relative to the member to be detected to allow generation of so-called one-pulse waveform (1 bit) as in the case of, for example, detecting an original point or the like of the scale, small waves are frequently generated as a noise beside the fundamental wave due to the fluctuation of the magnetic field caused around the electromagnetic characteristic changing portions, which makes the comparator processing difficult.

Figure 6A:
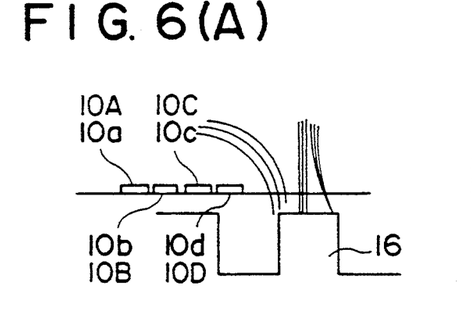
FIGS. 6(A) through 6(H) are views for use in describing a method for detecting the electromagnetic characteristic changing portion.

Now, each of the magneto-resistive elements 10a through 10d constituting the bridge circuit 20 is passed over the electromagnetic characteristic changing portion formed of the convex portion 16 of the scale 12 as shown in FIGS. 6(A) through 6(H). By the way, for the electrical resistance Ra through Rd, the resistance values thereof are not changed when the magnetic field is applied to the element in a perpendicular direction, while the resistance values thereof are reduced when the magnetic field is fluctuated at the electromagnetic characteristic changing portion of the convex region 16 to apply a transversal component to the element. Accordingly, the output E obtained in Equation 1 varies as follows:

For the condition shown in FIG. 6(A), $$Rb \times Rd - Ra \times Rc = 0;$$

Figure 6B:
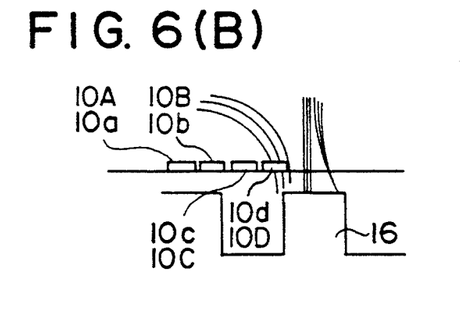

For the condition shown in FIG. 6(B), $$Rb \times Rd - Ra \times Rc < 0$$

Figure 6C:
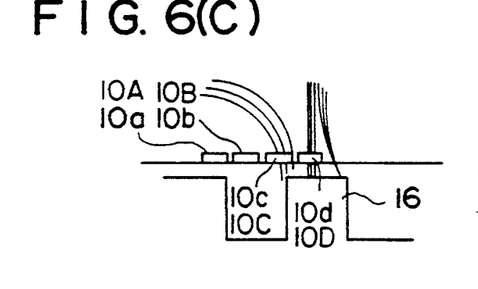

For the condition shown in FIG. 6(C), $$Rb \times Rd - Ra \times Rc > 0;$$

Figure 6D:
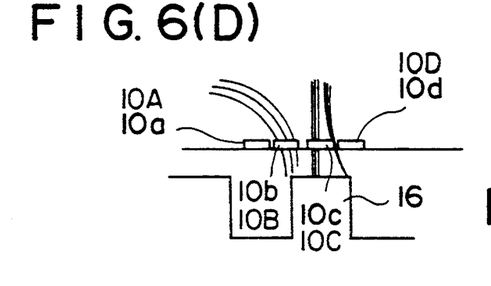

For the condition shown in FIG. 6(D), $$Rb \times Rd - Ra \times Rc < 0;$$

Figure 6E:
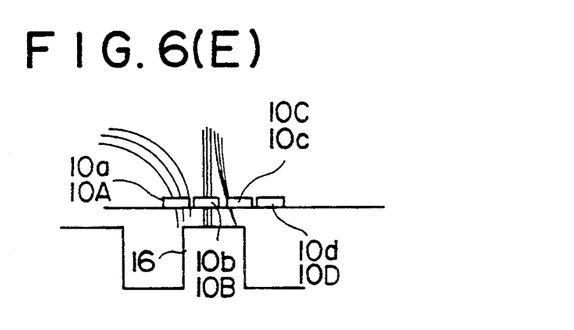

For the condition shown in FIG. 6(E), $$Rb \times Rd - Ra \times Rc < 0;$$

Figure 6F:
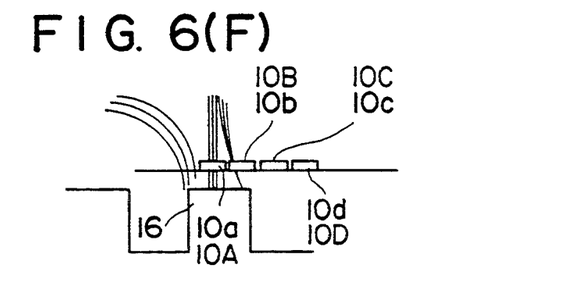

For the condition shown in FIG. 6(F), $$Rb \times Rd - Ra \times Rc < 0;$$

Figure 6G:
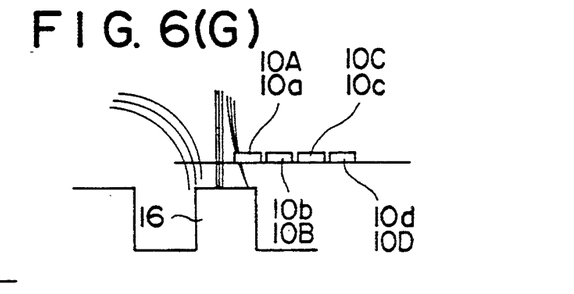

For the condition shown in FIG. 6(G), $$Rb \times Rd - Ra \times Rc > 0;$$

Figure 6H:
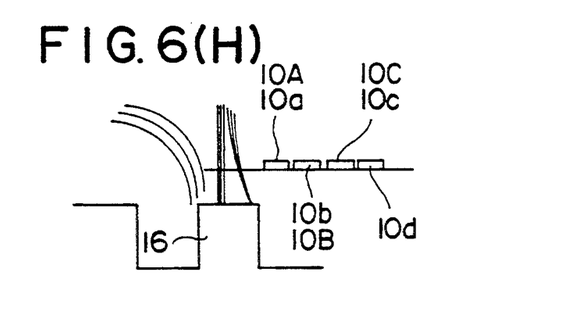
Figure 7:
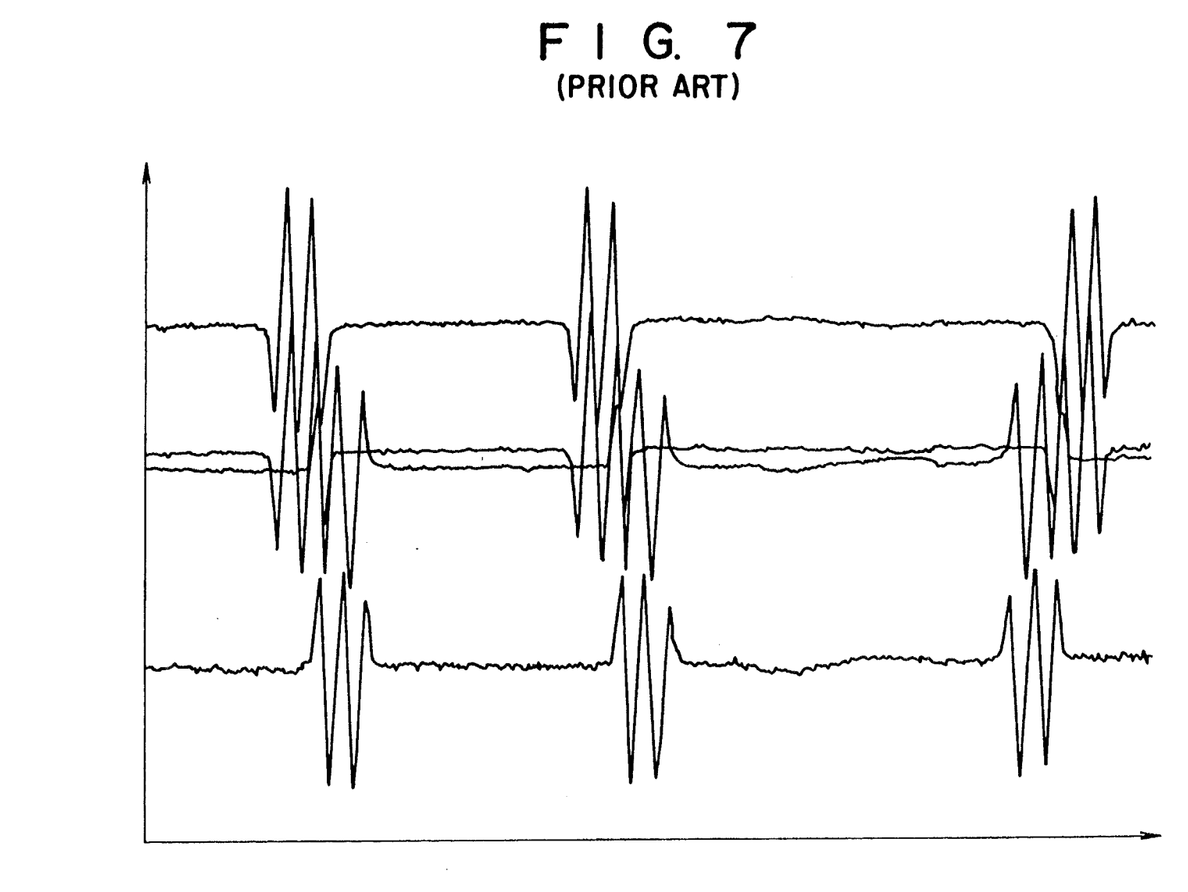
FIG. 7 is a diagram showing exemplified output waveforms of the conventional bridge circuit.

For the condition shown in FIG. 6(H), $$Rb \times Rd - Ra \times Rc = 0.$$

As apparent from the above, a plurality of output signals are produced on the positive side or on the negative side of the reference voltage (zero point). Consequently, in a conventional method for detecting the electromagnetic characteristic changing portion, detection of the one-pulse waveform results in detection of two output waveforms having approximately equal peaks on the positive side or on the negative side, which can be a cause of detection errors.

On the other hand, as disclosed in, for example, Japanese Patent Publication No. 56-1567, there are some cases where the electromagnetic characteristic changing portion is formed by means of polarization and magneto-sensitive directions of two pairs of ferromagnetic magneto-resistive elements connected in series and orthogonally crossed each other, whereby a difference between the outputs of the two is detected. In such a case, however, the output waveform becomes larger in width and in area, which causes degraded accuracy of detection.

SUMMARY OF THE INVENTION

The present invention is made to overcome the above mentioned problems inherent to conventional arts and is directed to provide a method and a device for detecting an electromagnetic characteristic changing portion that are capable of detecting a single electromagnetic characteristic changing portion with high accuracy as well as of obtaining an output waveform having narrow peak width.

The output E of the bridge circuit is proportional to, as apparent from Equation (1), the difference between the two products of the electrical resistance values of the opposing sides. Up to the present, the conventional wisdom is that having each pair of opposing sides of the bridge circuit formed of one element located at a position corresponding to a convex region and one element located at a position corresponding to a concave region would make the first and the second terms of the right-hand side of Equation (1) equal to each other, resulting in no output E of the bridge circuit.

However, according to the experiments conducted by the present inventor, concerning the distribution of the magnetic flux at the convex region for example, the distribution on the left side of the center of the convex region differs from, as shown in FIGS. 6(A) through 6(H), that on the right side thereof due to a lateral bias. In addition, the fluctuation of the magnetic flux is not symmetrically caused at the convex region, which may be a cause of production of the above mentioned plural output signals. Further, the present inventor has found that an output signal can be available even though each pair of opposing sides of the bridge circuit is formed of one element located at a position corresponding to a convex region and another element located at a concave region, i.e., when they are so connected that the detected signals are cancelled.

The present invention is made on the basis of these findings. A method for detecting an electromagnetic characteristic changing portion according to the present invention comprises the steps of aligning four electromagnetic sensing elements and a member, having the electromagnetic characteristic changing portion to be detected, in a row in a direction of relative movement therebetween; positioning the four sensing elements within the row in such a manner that, when two out of the four sensing elements are simultaneously located at a position corresponding to said electromagnetic characteristic changing portion as a result of relative movement, the remaining two sensing elements are located at a position not corresponding to the electromagnetic characteristic changing portion; and each of these four electromagnetic sensing elements is connected in a respective one of the four sides of a bridge circuit with each pair of opposing sides of the bridge circuit containing one electromagnetic sensing element located at the position corresponding to said electromagnetic characteristic changing portion and one electromagnetic sensing element located at the position not corresponding to said electromagnetic characteristic changing portion, thereby detecting the electromagnetic characteristic changing portion.

In addition, a device for detecting an electromagnetic characteristic changing portion according to the present invention comprises four electromagnetic sensing elements that move relatively to a member having the electromagnetic characteristic changing portion to be detected and that are aligned in a row in a direction of the relative movement; and a bridge circuit of which each of the four sides is formed of a respective one of the four electromagnetic sensing elements, the outer two of said four electromagnetic sensing elements aligned in a row being in two opposing sides, respectively, of said bridge circuit and the inner two of the four electromagnetic sensing elements being in the remaining two opposing sides, respectively, of the bridge circuit.

It is preferable that, if the width of the electromagnetic characteristic changing portion is equal to $\lambda/2$, each element is formed equal to $\lambda/4$ or slightly smaller than $\lambda/4$ while a pitch between the magneto-resistive elements is defined as $\lambda/4$ or slightly larger than $\lambda/4$.

According to the above mentioned structure, it is possible to remove an influence of a plurality of output waveforms due to the fluctuation of the magnetic field generated at an edge of the electromagnetic characteristic changing portion to obtain a single output waveform corresponding to the electromagnetic characteristic changing portion. In addition, it is possible to obtain an output waveform having a narrow peak width, allowing easy and highly accurate detection of the single electromagnetic characteristic changing portion.

BEST MODE FOR CARRYING OUT THE INVENTION

A preferred embodiment of a method and a device for detecting an electromagnetic characteristic changing portion according to the present invention is described with reference to the attached drawing. Parts corresponding to those described in conjunction with the background art are shown with the same reference numerals and a detailed description thereof will be omitted.

Figure 1A:
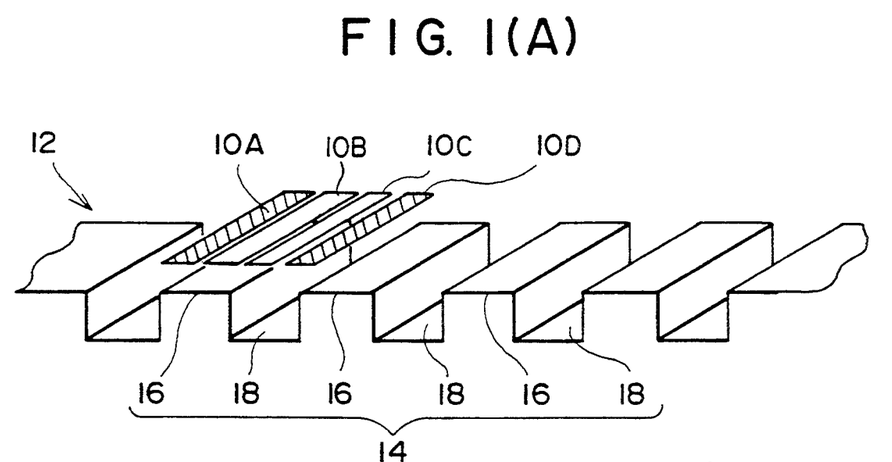
FIG. 1(A) is a perspective view showing each magneto-resistive element aligned with respect to an electromagnetic characteristic changing portion according to an embodiment of the present invention.
Figure 1B:
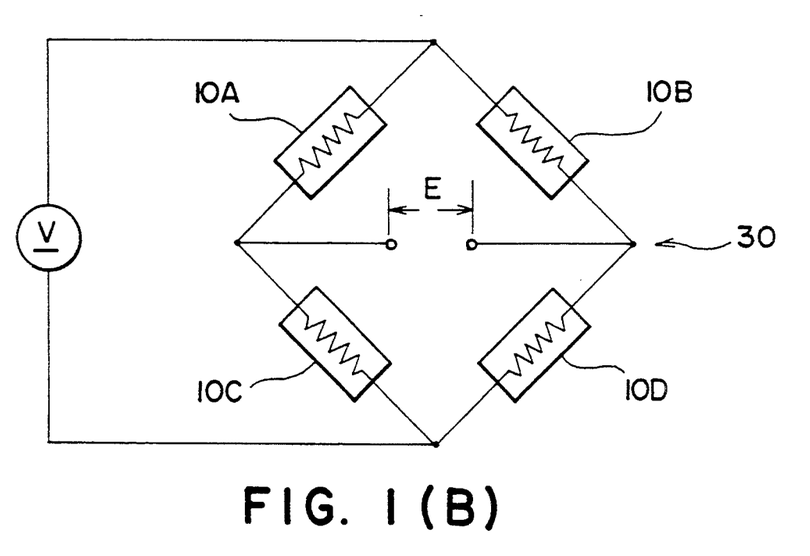
FIG. 1(B) is a view of a bridge circuit formed of these magneto-resistive elements.
Figure 1C:
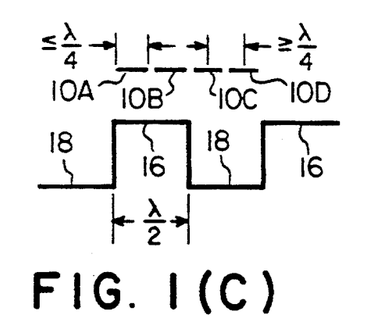
FIG. 1(C) is an elevational view of the magneto-resistive elements and electromagnetic characteristic changing portions of FIG. 1 (A).

FIGS. 1(A), 1(B), and 1(C) are views for use in describing a method and a device for detecting the electromagnetic characteristic changing portion according to an embodiment of the present invention, in which FIGS. 1(A) and 1(C) show an alignment condition of each electromagnetic sensing element while FIG. 1(B) shows a view of a bridge circuit formed of these electromagnetic sensing elements.

Four magneto-resistive elements 10A through 10D that serve as the electromagnetic sensing elements are arranged in a row along the graduation 14 of the scale 12 or a member to be detected. Each of the magneto-resistive elements 10A through 10D is contained in a magnetic shield case or the like (not shown), and is so held as to be movable relative to the scale 12. In addition, if the width of the convex region 16 or the electromagnetic characteristic changing portion of the scale 12 is equal to $\lambda/2$, the width of each of the magneto-resistive elements 10A through 10D is defined as approximately half of that width or as equal to or slightly smaller than $\lambda/4$, as illustrated in FIG. 1(C). Accordingly, when two elements 10A and 10B out of the magneto-resistive elements 10A through 10D are simultaneously located at a position corresponding to the convex region 16, the other two elements 10C and 10D are located at a position corresponding to the concave region 18.

In addition, the magneto-resistive elements 10A through 10D constitute, as shown in FIG. I(B), a bridge circuit 30 that serves as a detection circuit. The bridge circuit 30 differs from the bridge circuit 20 described in conjunction with the background art in that of the four magneto-resistive elements 10A through 10D aligned in a row the two cross-hatched magneto-resistive elements 10A and 10D located at positions corresponding to a convex region 16 and a concave region 18, respectively, form two opposing sides, respectively, of the bridge circuit 30. In addition, the remaining two magneto-resistive elements 10B and 10C, located at positions corresponding to a convex region 16 and a concave region 18, respectively, form the other two opposing sides, respectively, of the bridge circuit 30. Consequently, if $R_A$ through $R_D$ denote electrical resistance of the magneto-resistive elements 10A through 10D, respectively, then an output E of the bridge circuit 30 can be represented by:

$$E \propto R_B \times R_C - R_A \times R_D \quad (2).$$

Figure 2:
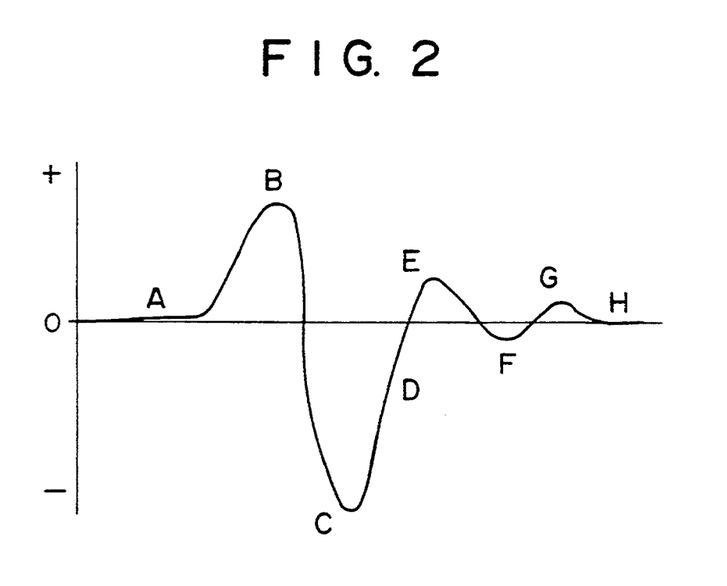
FIG. 2 is a typical output waveform of the bridge circuit according to the present embodiment.

As apparent from the above, the first term of the right-hand side of Equation (2) is a product of the resistance value More particularly, a typical representation of the output waveform of the bridge circuit 30 is as shown in FIG. 2, where one large peak is formed on each of the positive and the negative sides relative to the zero point of the reference voltage. The reference numerals A through H in FIG. 2 correspond to the cases of these conditions shown in FIGS. 6(A) through 6(H), respectively.

Figure 3:
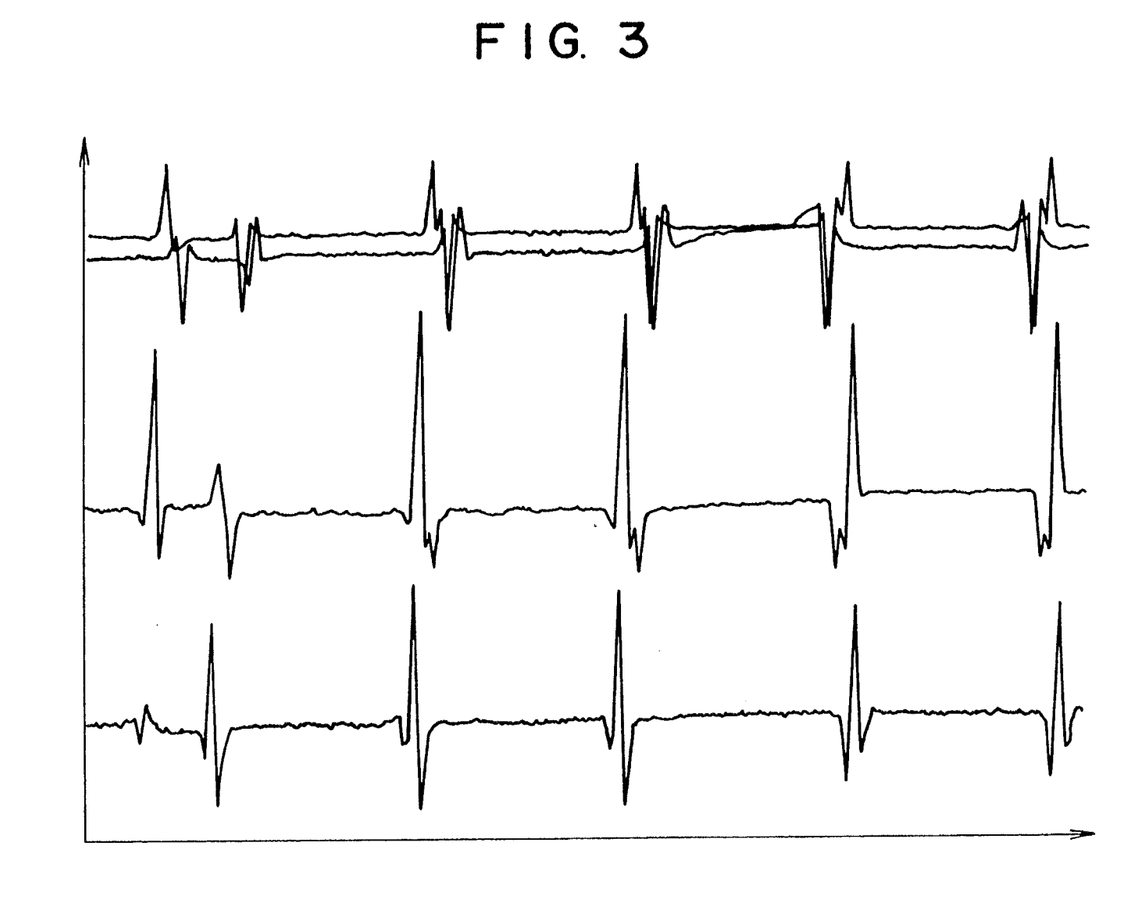
FIG. 3 is a diagram showing exemplified output waveforms of the bridge circuit according to the present embodiment.

FIG. 3 is a representation of the output waveform of the bridge circuit 30 when each convex region 16 of the scale 12 is formed with a width of 1 mm, each of the magneto-resistive elements 10A through 10D is formed with a width slightly smaller than 0.5 mm, and the pitch between the elements is 0.5 mm. As shown in FIG. 3, a waveform having one large peak on the positive side or on the negative side is obtained, so that it is possible to readily and positively detect the single electromagnetic characteristic changing portion formed for one bit such as an original point. Besides, the narrower width of the waveform results in an improved accuracy of detection.

Figure 8:
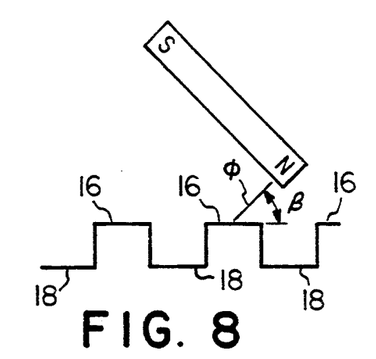
FIG. 8 is an elevational view of the magneto-resistive elements and eletromagnetic characteristic changing portions with the magnet being inclined at an angle to the line of relative movement.

In addition, the bridge circuit 30 is made up of four magneto-resistive elements 10A through 10D, which allows cancellation of an influence due to a change of the temperature. Of course, the accuracy of detection is improved even when the electromagnetic characteristic changing portion is varied cyclically and continuously as in the case of the graduation of the scale 12. Consequently, it becomes possible to reduce an influence of a noise or the like to reduce detection errors. Further, the peak can be increased by means of adjusting the magnetic field biased laterally. In particular, a bias angle $\beta$, as illustrated in FIG. 8, of 45° enables an increased peak height.

While the above mentioned embodiment has thus been described in conjunction with the case where the $R_B$ of the magneto-resistive element 10B located at the position corresponding to the convex region 16 and the resistance value $R_C$ of the magneto-resistive element 10C located at the position corresponding to the concave region 18, and the second term is represented as a product of the resistance value $R_A$ of the magneto-resistive element 10A located at the position corresponding to a convex region 16 and the resistance value $R_D$ of the magneto-resistive element 10D located at the position corresponding to a concave region 18. The output E is proportional to the difference between the first and the second terms.

In this event, when each of the magneto-resistive elements 10A through 10D constituting the bridge circuit 30 passes over a convex region 16 acting as the electromagnetic characteristic changing portion as shown in FIGS. 6 (A) through 6(H), the output E varies as follows:

For the condition shown in FIG. 6(A), $$R_B \times R_C - R_A \times R_D = 0;$$

For the condition shown in FIG. 6(B), $$R_B \times R_C - R_A \times R_D > 0$$

For the condition shown in FIG. 6(C), $$R_B \times R_C - R_A \times R_D < 0;$$

For the condition shown in FIG. 6(D), $$R_B \times R_C - R_A \times R_D < 0;$$

For the condition shown in FIG. 6(E), $$R_B \times R_C - R_A \times R_D > 0;$$

For the condition shown in FIG. 6(F), $$R_B \times R_C - R_A \times R_D < 0;$$

For the condition shown in FIG. 6(G), $$R_B \times R_C - R_A \times R_D > 0;$$

For the condition shown in FIG. 6(H), $R_B \times R_C - R_A \times R_D = 0.$ electromagnetic sensing elements are ferromagnetic magneto-resistive elements 10A through 10D, the electromagnetic sensing elements are not limited to the ferromagnetic magneto-resistive elements and can be semiconductor magneto-resistive elements, Hall elements, coils, or the like. In addition, while the above mentioned embodiment has thus been described in conjunction with the case where the electromagnetic characteristic changing portion is formed of the convex regions 16, the electromagnetic characteristic changing portion may be formed by means of polarization or the like. Furthermore, while the above mentioned embodiment has thus been described in conjunction with the case where the scale 12 is formed in straight line, it can be applicable to a rotary encoder or the like.

As described above with the four electromagnetic sensing elements aligned in a row, according to the present invention, each pair of two opposing sides of the bridge circuit is formed of one electromagnetic sensing element located at a position corresponding to the electromagnetic characteristic changing portion and one electromagnetic sensing element located at a position not corresponding to the electromagnetic characteristic changing portion, respectively. As a result, it is provided a 1-force waveform having one peak that is narrow in width on one side relative to the reference voltage and it is possible to detect a single electromagnetic characteristic changing portion such as an original point with high accuracy.

INDUSTRIAL APPLICABILITY

The present invention is useful as a method and a device for detecting, with high accuracy, an electromagnetic characteristic changing portion formed on a member to be detected, such as a position detecting device of a hydraulic cylinder, a linear scale, or a rotary encoder.

I claim:

1. A method for detecting an electromagnetic characteristic changing portion comprising the steps of:
    aligning four electromagnetic sensing elements and a member, having the electromagnetic characteristic changing portion to be detected, in a row in a direction of a relative movement therebetween;
    positioning the four electromagnetic sensing elements within the row in such a manner that, when two out of the four sensing elements are simultaneously located at a position corresponding to said electromagnetic characteristic changing portion as a result of relative movement, the remaining two sensing elements are located at a position not corresponding to the electromagnetic characteristic changing portion; and each of these four electromagnetic sensing elements is connected in a respective one of the four sides of a bridge circuit, with each pair of opposing sides of said bridge circuit containing one electromagnetic sensing element located at a position corresponding to said electromagnetic characteristic changing portion and one electromagnetic sensing element located at a position not corresponding to said electromagnetic characteristic changing portion, thereby detecting the electromagnetic characteristic changing portion.

2. A device for detecting an electromagnetic characteristic changing portion comprising:
    a member having the electromagnetic characteristic changing portion to be detected;
    four electromagnetic sensing elements that move relatively to said member having the electromagnetic characteristic changing portion to be detected and that are aligned in a row in a direction of the relative movement; said four electromagnetic sensing elements being positioned within said row in such a manner that, when two out of the four sensing elements are simultaneously located at a position corresponding to said electromagnetic characteristic changing portion as a result of relative movement, the remaining two sensing elements are located at a position not corresponding to the electromagnetic characteristic changing portion; and
    a bridge circuit of which each of the four sides is formed of a respective one of the four electromagnetic sensing elements;
    wherein the outer two of said four electromagnetic sensing elements aligned in a row are in two opposing sides, respectively, of said bridge circuit and the inner two of said four electromagnetic sensing elements are in the remaining two opposing sides, respectively, of the bridge circuit.

3. A method for detecting an electromagnetic characteristic changing portion, said method comprising the steps of:
    aligning four electromagnetic sensing elements and a member, having an electromagnetic characteristic changing portion to be detected, in a row in a direction of relative movement therebetween;
    positioning the four sensing elements within the row in such a manner that, when two out of the four sensing elements are simultaneously located at a position corresponding to said electromagnetic characteristic changing portion as a result of relative movement, the remaining two sensing elements are located at a position not corresponding to the electromagnetic characteristic changing portion, with each of these four electromagnetic sensing elements being connected in a respective one of the four sides of a bridge circuit with each pair of opposing sides of the bridge circuit containing one electromagnetic sensing element located at the position corresponding to said electromagnetic characteristic changing portion and one electromagnetic sensing element located at the position not corresponding to said electromagnetic characteristic changing portion; and
    applying a magnetic field to the electromagnetic characteristic changing portion, whereby said bridge circuit detects fluctuation of magnetic flux caused by the electromagnetic characteristic changing portion.

4. A method in accordance with claim 3, wherein said member has a plurality of electromagnetic characteristic changing portions aligned in the form of a scale.

5. A method in accordance with claim 4 wherein each electromagnetic characteristic changing portion has a width of $\lambda/2$, each of said four sensing elements has a corresponding width equal to or slightly smaller than $\lambda/4$, and the pitch between adjacent ones of said four sensing elements is equal to or slightly larger than $\lambda/4$.

6. A method in accordance with claim 5, wherein said scale is in the form of a graduation of concave portions and convex portions, with each electromagnetic characteristic changing portion being one of said convex portions.

7. A method in accordance with claim 3, wherein each sensing element is a magneto-resistive element.

8. A method in accordance with claim 7, wherein each sensing element is a ferromagnetic magneto-resistive element.

9. A method in accordance with claim 7, wherein each sensing element is a semiconductor magneto-resistive element.

10. A method in accordance with claim 3, wherein the four electromagnetic sensing elements are aligned in said row so that there is an outer pair of sensing elements in said row and an inner pair of sensing elements in said row, and wherein one pair of opposing sides of the bridge circuit contains the outer pair of electromagnetic sensing elements and the other pair of opposing sides of the bridge circuit contains the inner pair of electromagnetic sensing elements.

11. A method in accordance with claim 3, further comprising obtaining from said bridge circuit a single output waveform corresponding to the electromagnetic characteristic changing portion.

12. A method in accordance with claim 11, wherein said single output waveform has a narrow peak width, thereby allowing accurate detection of a single electromagnetic characteristic changing portion.

13. A method in accordance with claim 3, wherein said electromagnetic characteristic changing portion is varied cyclically and continuously.

14. A method in accordance with claim 3, wherein said magnetic field is applied at an angle to the electromagnetic characteristic changing portion.

15. A method in accordance with claim 14, wherein said angle is about 45°.

16. A device for detecting an electromagnetic characteristic changing portion, said device comprising;
a member having the electromagnetic characteristic changing portion to be detected;
four electromagnetic sensing elements that move relative to said member in a direction of relative movement, said four sensing elements being aligned in a row in said direction of relative movement such that there is an outer pair of sensing elements in said row and an inner pair of sensing elements in said row; said four electromagnetic sensing elements being positioned within said row in such a manner that, when two out of the four sensing elements are simultaneously located at a position corresponding to said electromagnetic characteristic changing portion as a result of relative movement, the remaining two sensing elements are located at a position not corresponding to the electromagnetic characteristic changing portion;
a bridge circuit having four sides, with each of said four sides containing a respective one of said four electromagnetic sensing elements, said outer pair of sensing elements being in two opposing sides, respectively, of said bridge circuit, and said inner pair of sensing elements being in the remaining two opposing sides, respectively, of said bridge circuit; and
a means for applying a magnetic field to the electromagnetic characteristic changing portion, whereby said bridge circuit detects fluctuation of magnetic flux caused by relative movement between the electromagnetic characteristic changing portion and said four electromagnetic sensing elements in said direction of relative movement.

17. A device in accordance with claim 16, wherein said member has a plurality of electromagnetic characteristic changing portions aligned in the form of a scale.

18. A device in accordance with claim 17 wherein each electromagnetic characteristic changing portion has a width of $\lambda/2$, each of said four sensing elements has a corresponding width equal to or slightly smaller than $\lambda/4$, and the pitch between adjacent ones of said four sensing elements is equal to or slightly larger than $\lambda/4$.

19. A device in accordance with claim 18, wherein said scale is in the form of a graduation of concave portions and convex portions, with each electromagnetic characteristic changing portion being one of said convex portions.

20. A device in accordance with claim 16, wherein each sensing element is a magneto-resistive element.

21. A device in accordance with claim 20, wherein each sensing element is a ferromagnetic magneto-resistive element.

22. A device in accordance with claim 20, wherein each sensing element is a semiconductor magneto-resistive element.

23. A device in accordance with claim 16, wherein said electromagnetic characteristic changing portion varies cyclically and continuously.

24. A device in accordance with claim 16, wherein said means for applying said magnetic field applies said magnetic field at an angle to the electromagnetic characteristic changing portion.

25. A device in accordance with claim 24, wherein said angle is about 45°.

* * * * *